(12) United States Patent
Kamel et al.

(10) Patent No.: US 6,263,411 B1
(45) Date of Patent: Jul. 17, 2001

(54) VIDEO SERVER SCHEDULING FOR SIMULTANEOUS READ-WRITE REQUESTS

(75) Inventors: Ibrahim Kamel, Monmouth Junction, NJ (US); Walid G. Aref, Alexandria (EG); Rafael Alonso, Cranbury, NJ (US)

(73) Assignee: Matsushita Electric Industrial Co., Ltd.

( * ) Notice: Subject to any disclaimer, the term of this patent is extended or adjusted under 35 U.S.C. 154(b) by 0 days.

(21) Appl. No.: 08/718,279

(22) Filed: Sep. 20, 1996

(51) Int. Cl.[7] ................................................ G06F 12/00
(52) U.S. Cl. ......................... 711/167; 711/158; 711/151
(58) Field of Search .................................... 711/100, 158, 711/151, 167; 725/145, 147

(56) References Cited

U.S. PATENT DOCUMENTS

| | | | | |
|---|---|---|---|---|
| 5,379,379 | * | 1/1995 | Becker et al. ........................... | 711/3 |
| 5,524,235 | * | 6/1996 | Larson et al. ........................ | 711/151 |
| 5,541,912 | * | 7/1996 | Choudhury et al. ................. | 370/412 |
| 5,737,547 | * | 4/1998 | Zuravleff et al. .................... | 710/112 |
| 5,809,278 | * | 9/1998 | Watanabe et al. ................... | 711/150 |

* cited by examiner

Primary Examiner—Reginald G. Bragdon
Assistant Examiner—Matthew D. Anderson
(74) Attorney, Agent, or Firm—Harness, Dickey & Pierce, P.L.C.

(57) ABSTRACT

A process is presented for supporting simultaneous disk read and write requests in a video server environment. Read requests are the result of movie viewing, while write requests are the result of video clip editing or movie authoring procedures. Due to real-time demands of movie viewing, read requests have to be fulfilled within certain deadlines, otherwise they are considered lost. Since the data to be written into disk is stored in main memory buffers, write requests can be postponed until critical read requests are processed. However, write requests still have to be proceeded within reasonable delays and without the possibility of indefinite postponement. This is due to the physical constraint of the limited size of the main memory write buffers. The new process schedules both read and write requests appropriately, to minimize the amount of disk reads that do not meet their presentation deadlines, and to avoid indefinite postponement and large buffer sizes in the case of disk writes.

20 Claims, 4 Drawing Sheets

VIDEO SERVER SCHEDULING FOR SIMULTANEOUS READ-WRITE REQUESTS

BACKGROUND OF THE INVENTION

1. Field of the Invention

The present invention relates to a new disk scheduling algorithm for supporting simultaneous read and write requests that are made by the user in the presence of real-time requirements that are associated with these requests.

2. Description of Background Art

Video-on-demand and video authoring tools are emerging as very interesting and challenging multimedia applications. They require special hardware and networking protocols that can accommodate the real-time demands of these applications as well as the high bandwidth that they need.

Several video server architectures are proposed for handling video-on-demand applications. "A Video Server Using ATM Switching Technology," Y. Ito and T. Tanaka, in *The 5th International Workshop on Multimedia Communication*, pages 341–346, May 1994; "A File System for Continuous Media", David Anderson, Yoshitomo Osawa, and Ramesh Govindan, *ACM Trans. Computer Systems*, 10(4):311–337, 1992; "Designing An On-Demand Multimedia Service", P. V. Rangan, H. M. Vin, and S. Ramanathan, *IEEE Communication Magazine*, pages 56–64, July 1992. The present invention is well adapted to work on a server architecture such as the one proposed in *The 5th International Workshop on Multimedia Communication* that uses multiple disks and file servers that are internally connected by an ATM network. The invention may be implemented on other architectures, as well. Several performance studies and simulations have been conducted to estimate the performance of this system.

A video server can support a variety of applications. Among these applications are: video-on-demand, and video authoring or editing. Each application has its own system requirements. Our focus here is on the disk scheduling requirements of such systems. For example, from the disk's point of view, video-on-demand applications issue read-only requests to the disk, while video editing applications issue both read and write requests. Moreover, some applications may issue read and/or write requests that may or may not have real-time deadlines so that these requests have to be serviced before the deadlines. For example, in video-on-demand, each read request has to be fulfilled within a given deadline. Finally, some applications may allow some of its read or write requests to be lost by the system, i.e., they are not serviced or fulfilled by the disk. For example, some frames can be lost during video viewing due to congestion in the disk.

More formally, from the disk scheduling point of view, we classify read and write requests into four categories, where each category has different requirements and is useful for a certain class of applications. These categories are:

1. dl requests: these are read or write requests that have deadlines and the requests may be lost in the case of congestion. Read and write requests of this category are referred to as $R_{dl}$ and $W_{dl}$, respectively.
2. dn requests: these are read or write requests that have deadlines and the requests may not be lost regardless of the congestion in the system. Read and write requests of this category are referred to as $R_{dn}$ and $W_{dn}$, respectively.
3. nl requests: there are read or write requests that have no deadlines and the requests may be lost in case of congestion. Read and write requests of this category are referred to as $R_{nl}$ and $W_{nl}$, respectively.
4. nn requests: these are read or write requests that have no deadlines and the requests may not be lost regardless of the congestion in the system. Read and write requests of this category are referred to as $R_{nn}$ and $W_{nn}$, respectively.

For example, the application requirement in the case of video-on-demand is that the disk scheduling process must support only $R_{dl}$ requests, i.e., read requests that have deadlines but can be lost in case the requests do not get serviced before their deadlines.

Different disk scheduling processes need to be designed for each category of requests. Notice that for the requests that belong to the category nl (whether $W_{nl}$ or $R_{nl}$), since there are no deadlines, it is always true that these requests can be delayed until they are satisfied. Therefore, it makes no sense for the system to lose them as they can afford to wait until they get serviced. As a result, $W_{nl}$ and $R_{nl}$ are treated here as $W_{nn}$ and $R_{nn}$, respectively, since they have no deadline and will never be lost. As a result, disk scheduling techniques for only the dl, dn, and nn categories are expressly considered here.

SUMMARY OF THE INVENTION

The present invention provides a new disk scheduling process that supports the $R_{dl}$ and $R_{nn}$ categories for read requests and the $W_{nn}$ category for write requests. This combination of categories fits naturally into some common applications for video servers.

Thus, the present invention is directed toward extending the functionality of video servers so that they can handle video authoring and editing simultaneously with video-on-demand requests. In this new environment, some users are requesting video streams (e.g., movies) that are already existing video streams. From the video server's point of view, the major difference is that video-on-demand is a read-only application, while video editing and authoring is a read/write application. This difference impacts the design of the processes in a video server.

These and other objects are obtained by providing a method of supporting simultaneous disk read and write requests in a video server, comprising the steps of: assigning a deadline to the write requests based on an amount of available space in a buffer pool; inserting the read requests and said the requests in a common disk queue; and processing said read and write requests which come to a head of the queue.

The objects of the present invention are also obtained by providing a video server architecture for supporting simultaneous disk read and write requests, comprising: a memory buffer pool in which the read and write requests are temporarily stored; a common disk queue in which the read and write requests are received from the memory buffer pool; and a file server for processing the read and write requests, the file server having at least one disk; control means for determining locations for inserting the read and write requests in the disk queue, wherein the write requests are assigned a deadline.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only and thus are not limitative of the present invention, and wherein.

DETAILED DESCRIPTION OF THE PREFERRED EMBODIMENTS

The present invention relates to disk scheduling for handling simultaneous read and write requests in the presence of real-time requirements for video presentation and video editing. More specifically, the process of the present invention supports the $R_{dl}$ and the $R_{nn}$ categories for read requests and the $W_{nn}$ category for write requests. Video presentation or viewing results in read requests ($R_{dl}$ requests) to the file system, while video editing results in both read and write requests ($R_{nn}$ and $W_{nn}$ requests).

Figure 1:
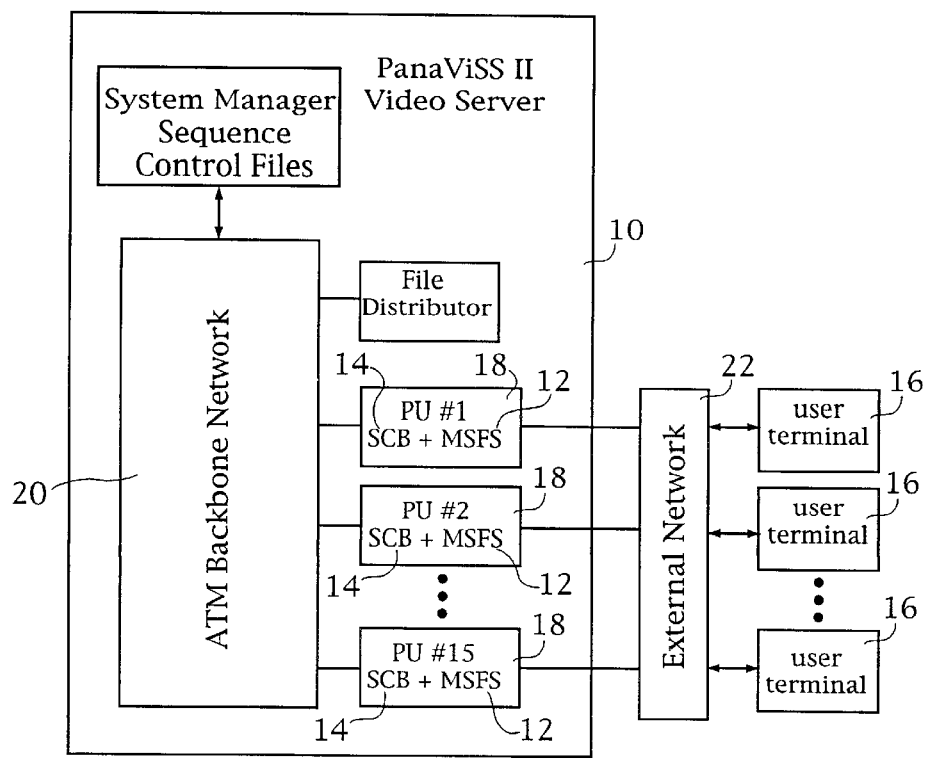
FIG. 1 is a schematic view of the architecture of a video server used in conjunction with the present invention.

The present invention may be practiced on a video server architecture that was originally proposed in "A File System For Continuous Media", at *The 5th International Workshop on Multimedia Communication*, pages 341–346, May 1994 which is herein incorporated by reference. The main components of this architecture are shown in FIG. 1. A brief overview of the server architecture is provided below.

The video server 10 supports MPEG-encoded (compressed) video streams. Each stream is broken into fixed-length pieces, termed media segment file (MSF) blocks. The media segment file blocks for a given video stream are stored distributively through the whole file system. The file system has multiple disk storage servers, where each storage server is termed a Media Segment File Server (MSFS) 12. The media segment file server 12 stores blocks of media segment files (MSFs) that belong to a variety of video streams.

In order to be able to retrieve the video stream in the correct order, a Sequence Control Broker (SCB) 14 stores an ordered list of pointers to all the media segment file blocks of a video stream. The sequence control broker 14 acts on behalf of users to maintain a video playback stream. Each sequence control broker 14 can support more than one user terminal 16 simultaneously, e.g., 24 or 64 users. The number of user terminals 16 connected to one sequence control broker 14 is predetermined in a way such that the overall system guarantees continuous video playback for all users.

In the initialization of the video playback session, the sequence control broker (SCB) 14 fetches the list of pointers for the requested movie. During the playback, the sequence control broker 14 sends the read requests to the media segment file servers (MSFS) 12 on behalf of the user, to guarantee an uninterrupted service to the user. The sequence control broker (SCB) 14 is also responsible for handling virtual video cassette recorder (VCR) function requests, e.g., fast forwarding and rewinding.

The sequence control broker (SCB) 14 and the media segment file server (MSFS) 16 are built into one main building block, termed a video Processing Unit (PU) 18. In one video server, there can be multiple PU units 18, e.g., fifteen units. Each sequence control broker (SCB) 14 can directly access the data that locally resides in its corresponding media segment file server 12. However, since media segment files are stored across multiple media segment file servers 12, the sequence control broker 14 needs to access the media segment file servers 12 of the other processing units 18.

In order for the processing units 18 to communicate, they are all connected to an ATM switch 20. For example, a sequence control broker 14 uses the ATM switch 20 to retrieve a media segment file that is distributed across the media segment file servers 12 which reside in multiple processing units. The ATM switch 20 provides a mesh network that guarantees a connection from each sequence control broker 14 in the system to all of the media segment file servers 12.

The sequence control brokers 14 are connected from the other side to an external network 22 that connects the video server 10 to the end users 16. Users 16 are connected to the external network 22 by using set-top boxes that have the following functions: decoding MPEG-encoded video data, providing user interface for virtual VCR function requests and communicating with the sequence control brokers 14.

$R_{dl}$ read requests are the result of users demanding to view a certain movie or a video clip at a certain time. Once admitted to the system, the user is guaranteed a certain quality of service. This is expressed in terms of viewing a continuous stream of frames where the rate of frame loss is very low and is not noticed by the viewer. Frame losses are possible due to many reasons, of concern here are the losses due to the congestion of the disk in the media segment file servers 12.

Each read request to the disk, of a media segment file server 12, has a real-time deadline. Th e media segment file server 12 decides whether it can fulfill the request within this deadline or not. Based on this, the read request is accepted or rejected by the media segment file server 12. In the latter case, the page corresponding to the rejected read request is considered lost.

Seek time is the most ti me-consuming part of retrieving a page from a disk. One of the purposes of disk scheduling processes is to reduce the seek time. This can be achieved by queuing and ordering the disk access requests so that seek time is minimized. Process SCAN is one of the traditional disk scheduling processes that addresses this problem. *Operating System Concepts, 4th Edition*. A. Silberschatz and P. B. Galvin. Addison-Wesley, 1994. In SCAN, the disk head moves in one direction (either inwards or outwards), and services disk requests whose cylinder position falls at the position where the disk head is currently located. Once it reaches the highest cylinder position, the disk head reverses its moving direction, and services disk requests which happen to lie along its path.

With real-time requirements, SCAN is modified to meet the real-time considerations of the requested pages. Process SCANRT (SCAN with Real-Time considerations) is the modified version of SCAN. SCANRT services disk requests in SCAN order provided that the newly inserted request in the disk query does not violate the real-time requirements of the disk requests already present in the queue. If the insertion of the new request in SCAN order causes other requests already present in the disk queue to miss their deadlines, then the new request is inserted at the end of the queue. At this time, it is determined if the newly inserted disk request can be serviced in time to meet its own deadline. If not, the request is discarded and considered lost.

It is important to mention that the system load can be characterized by the amount of dl to nn requests, e.g., a mix ratio of 50%-50% or 90%-10%. This reflects the amount of video presentations versus editing activities in the video server 10.

In a video editing or authoring session, both read and write requests can take place. First, write requests will be discussed and then read requests will be addressed.

In a video editing session, write requests that take place during the session are modeled as belonging to the $W_{nn}$ category. The $W_{nn}$ category for write requests have different characteristics than the read requests for video presentation and hence are handled differently by the system. These characteristics can be summarized as follows.

Figure 2:
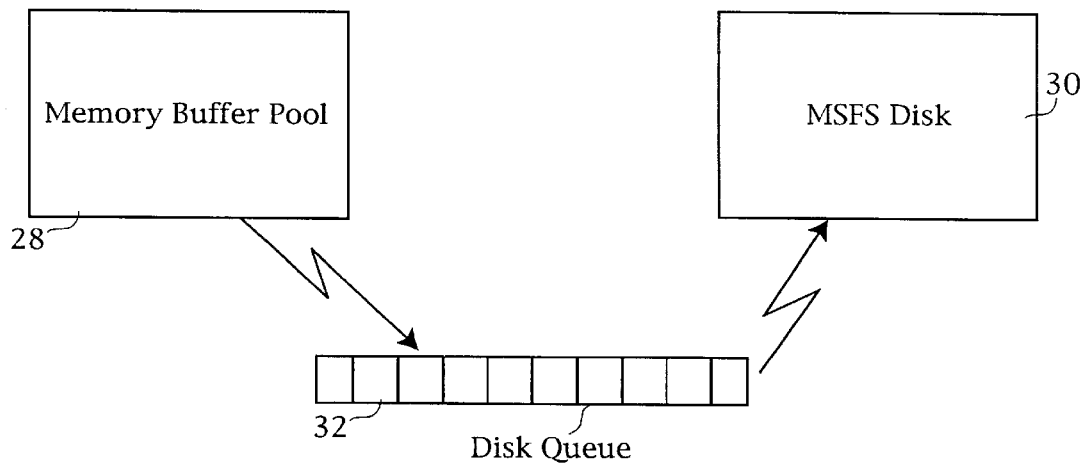
FIG. 2 is a data flow diagram of read and write requests according to the present invention.

1. Any page to be written to the disk is already pre-stored in a main memory write buffer pool 28.
2. A $W_{nn}$ write request has no real-time deadline. Therefore, it can afford longer delays than read requests.
3. Although it does not have a deadline, a $W_{nn}$ write request still cannot wait indefinitely. It has to be fulfilled some time in the future, to avoid the write buffer pool 28 becoming full.
4. A $W_{nn}$ write request cannot be lost due to system load, etc. Regardless of the system load, a write request has to be fulfilled by the system at some point in time.
5. Based on the system load, the write buffer pool 28 can become full. At this point, some pending $W_{nn}$ write requests have to be flushed into disk 30, as shown in FIG. 2, to release buffer space for the newly arriving write requests.
6. A $W_{nn}$ write request should be resilient to system crashes, e.g., power failure. In other words, from the user's perspective, once the system acknowledges a write request, the user expects the written page $p_w$ to be present in the system at any time in the future. This is despite the fact that the write pages $p_w$ may be stored temporarily into memory buffers, and hence there is a risk of losing it in case of power failure. The system should take necessary precautions to prevent this scenario from happening.

Based on the above points, there are some parameters that are critical to the performance of the system. The most important of these is the size of the write buffer pool 28, as shown in FIG. 2. A larger write buffer pool is expected to reduce the requirements imposed on the system due to write requests.

In order to handle both $R_{dl}$ read and $W_{nn}$ write requests simultaneously, the system employs a homogeneous frame into which both requests can fit, and which supports both types of requests.

The present invention achieves this by developing an artificial deadline for the completion of $W_{nn}$ write requests that reflects the write request characteristics, described above. Since $R_{dl}$ read requests also have deadlines, this provides a homogeneous way of treating both categories of read and write requests.

Figure 5A:
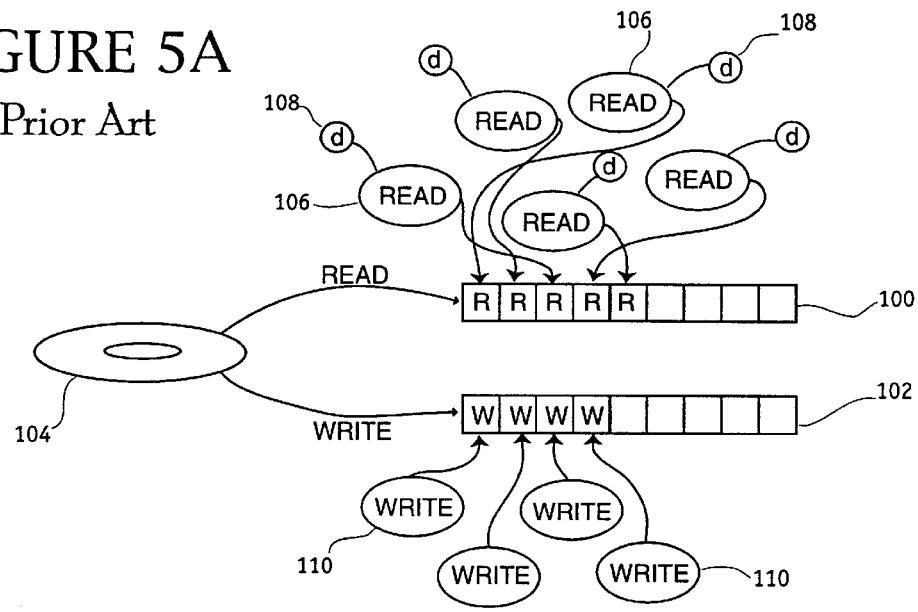
FIG. 5A and 5B (collectively FIG. 5) is a block diagram presenting an overview of some of the techniques used in the invention.
Figure 5B:
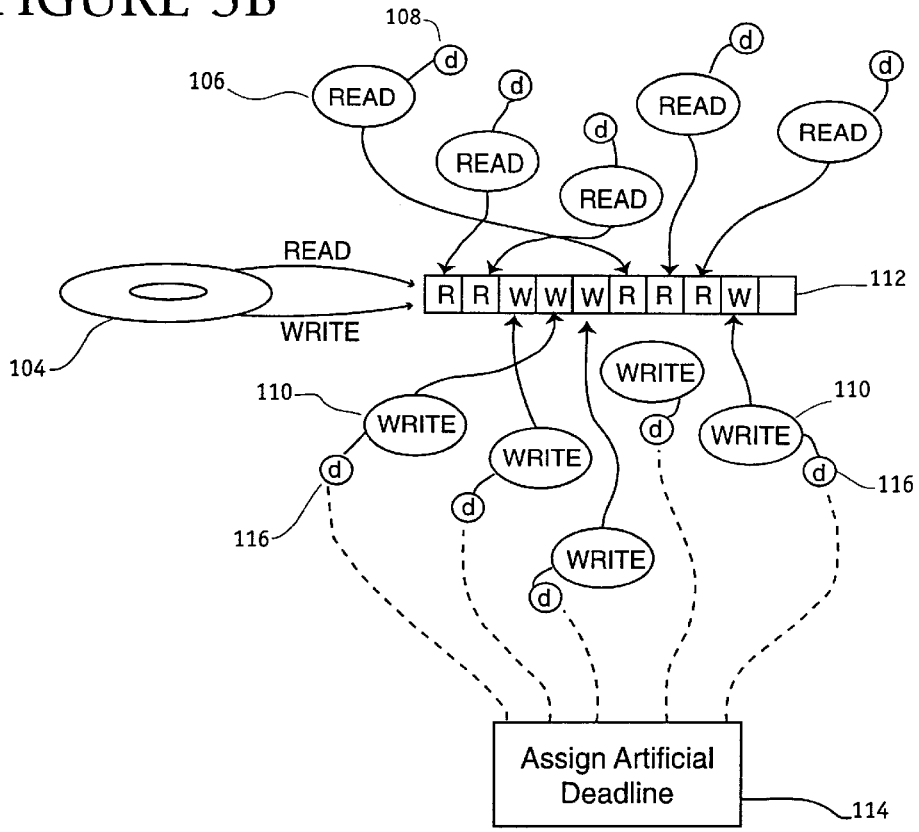

Before presenting a detailed description of the disk scheduling techniques of the invention, an overview of some of the basic concepts will be presented. Refer to FIGS. 5A and 5B (also collectively referred to as FIG. 5). FIG. 5A shows how the conventional disk scheduling process would operate. FIG. 5B shows how the present invention operates. A comparison of these two figures may help in understanding some of the principles of the invention.

In FIG. 5A separate read queue 100 and write queue 102 service the read and write disk access. In FIG. 5A the disk is diagrammatically illustrated at 104. The individual read requests 106 each have an associated deadline 108. In FIG. 5A the individual read requests are illustrated diagrammatically as ovals 106 having an associated deadline parameter 108. These read requests originate from one or more users of the system at various different times. As seen in FIG. 5A, the read requests are assigned to memory locations in queue 100 based on the deadline parameter. Thus read requests with short deadline are placed nearer the head of the queue where they will be processed more quickly. The deadline attributes are used to arrange the read requests in "elevator" order. The requests are placed in the queue with a view towards efficient disk access. Thus read requests are arranged to read contiguously stored records wherever possible.

In contrast to the read requests, the write requests (illustrated diagrammatically at 110) do not have assigned deadlines. Thus when a user of the system submits a write request, the request is placed in the next available memory location in write queue 102. Read and write access vis-a-vis disk 104 is handled by processing read queue 100 first, and processing write queue 102 only when there is free time not being used to support the read queue.

Referring now to FIG. 5B, the present invention dispenses with the need to utilize separate read and write queues. Instead, the present invention uses a single homogeneous queue 112 that supports both read requests and write requests in the same memory structure. As described above, the read requests 106 have an associated deadline attribute 108. Departing from conventional practice, the present invention employs a prioritizer module 114 that assigns realistic but artificial deadlines to all write requests. Thus in FIG. 5B write requests 110 now each have associated with them a deadline attribute 116. As will be described more fully in the detailed description to follow, these deadlines are assigned based on available free buffer space. Having artificially assigned deadlines to all write requests, read and write requests may now be processed through a single homogeneous queue 112 using the elevator prioritizing scheme. The arrangement guarantees that no write requests are lost by sacrificing read requests as needed to prevent buffer overflow. In effect, the invention examines all deadlines when read and write requests are put into the system, pushing the higher priority (shorter deadline) read and write requests closer to the head of the queue.

The following parameters are used in order to describe the process of the present invention.

$N_b$: the size, in bytes, of the write buffer pool 28, $P_w$: the size, in bytes, of a write page (from these two parameters, we can compute, $N_w$, the number of write pages that the buffer can accommodate), and $\lambda_w$: the arrival rate of disk write requests to the system.

Assume that at time t, a user requests that a page, say $p_w$, be written into the disk 30. A deadline is assigned for page $p_w$ so that page $p_w$ has to be written into the disk 30 before the deadline.

The deadline of a write request is computed in the following way. Let $n_w(t)$ be the number of write requests that exist in the buffer 28 at time t, and $n_f(t)$ be the number of free buffer slots in the buffer pool 28 at time t. Then, $n_f(t)=$ $N_{w-nw}(t)$. In the worst case scenario, because of the $R_{dl}$ read requests, no pages will be written from the buffer 28 to the disk 30, and at the same time, new write requests will continue to arrive to the write buffer pool 28 at a rate of $\lambda_w$. As a result, at the time a write page $p_w$ arrives to the buffer pool 28 (due to a new write request), the time needed, say d(t) before the write buffer pool 28 gets full, can be estimated given this worst case scenario. d(t) can be computed as follows $$d(t) = t + \frac{n_f(t)}{\lambda_w}$$

Notice that d(t) is in fact the deadline of any page in the write buffer pool 28 at time t, i.e., d(t) is a global deadline for all the pages currently in the write buffer 28. As a result, when a page $p_w$ is written physically into the disk 30, it frees one buffer slot in the buffer pool 28. Thus, the deadline d(t) for all of the pages in the buffer pool 28 is relaxed since there is now more time until the buffer 28 becomes full. Therefore, d(t) is relaxed in the following way. Let $t_o$ be the last time d(t) was modified. Then $$d(t) \leftarrow t - t_o + d(t_o) + \frac{1}{\lambda_w}$$

This is also consistent with the above formula for d(t), i.e., $$d(t) \leftarrow t - t_o + d(t_o) + \frac{1}{\lambda_w} = t - t_o + t_o + \frac{n_f(t_o)}{\lambda_w} + \frac{1}{\lambda_w}$$

$$= t + \frac{n_f(t_o) + 1}{\lambda_w}$$

$$= t + \frac{n_f(t)}{\lambda_w}$$

Notice that since $t_o$ is the last time any change in the buffer pool 28 is made, then $n_f(t) = n_f(t_o) + 1$ is the new amount of space after the write page has been physically written into disk 30.

When a write page request arrives, the corresponding page, say $p_w$, is placed in the write buffer pool 28. In order to insert a write request into the disk queue 32, the read/write scheduling system has to assign a deadline, say $d_w(t)$, for $p_w$, that corresponds to the global deadline d(t) of the write buffer pool 28, i.e., $d_w(t) \leftarrow d(t)$. Finally, $p_w$ and its deadline $d_w(t)$ are inserted into the disk queue 32. A major advantage of the present invention is that the scheduling process attempts to place the write requests in scan order in a manner similar to the way the SCANRT process handles read requests. The mechanism by which this is achieved and the interplay between read and write requests in the disk queue 32 is described below.

As mentioned previously, the SCANRT disk scheduling process maintains a queue, termed the disk scheduler queue, or simply, the disk queue, where entries in the disk queue 32 represent requests to the disk 30 to either read or write a single page. The requests in the disk queue 32 are ordered in SCAN order to reduce the seek time as long as there are no deadline violations for any of the requests in the disk queue 32.

In contrast to read-only mixes, there are four events that need to be considered when handling simultaneous $R_{dl}$ and $W_{nn}$ requests in the disk queue 32. These can be classified in the following way: (1) inserting a $W_{nn}$ write request into the disk queue 32, (2) inserting an $R_{dl}$ read request into the disk queue 32, (3) processing an $R_{dl}$ read request (performing the actual read from the disk 30), and (4) processing a $W_{nn}$ write request (performing the actual write into the disk 30). The new process performs different actions at each of these events which are discussed below.

Inserting a $W_{nn}$ Write Request

Figure 3:
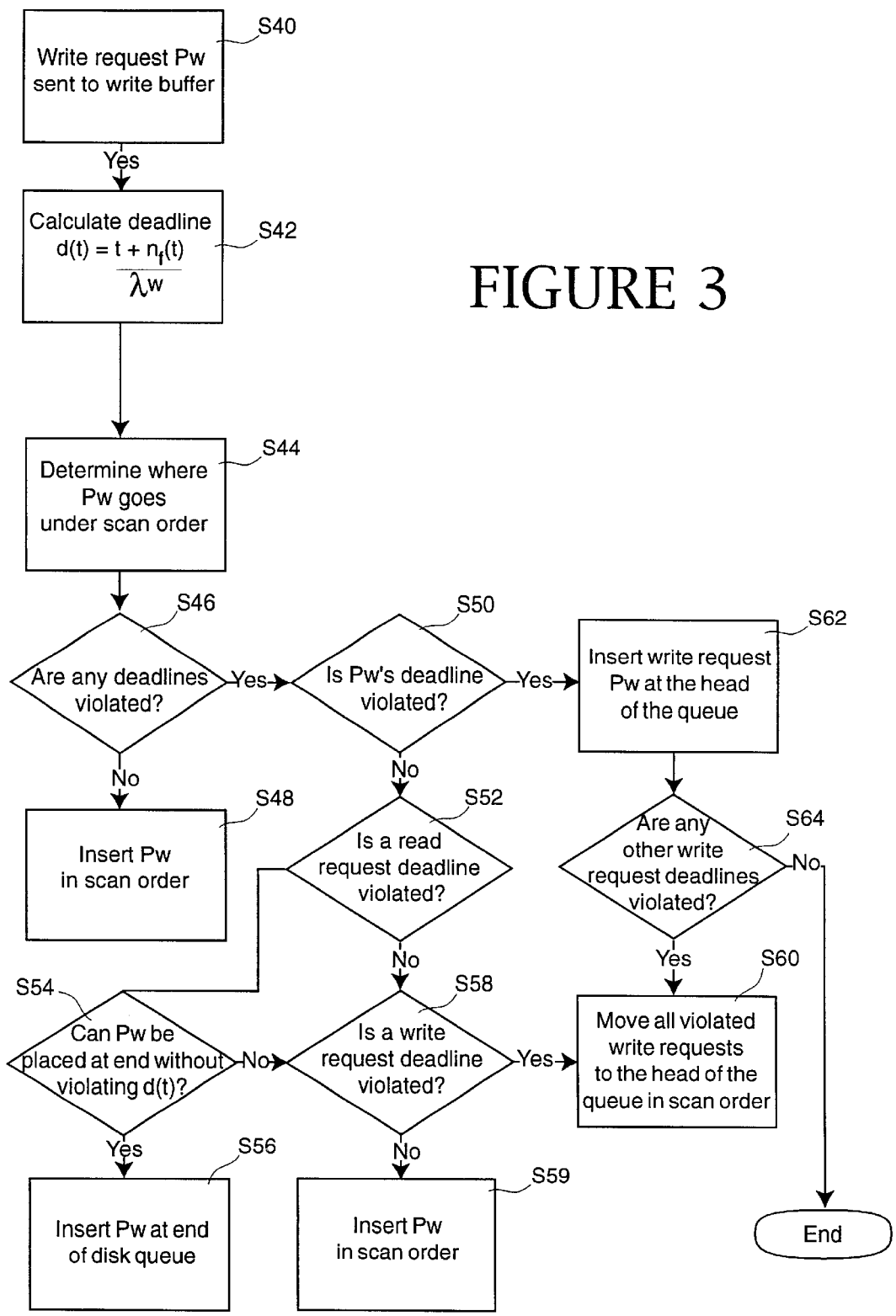
FIG. 3 is a flow chart illustrating the process used for determining the location that write requests are inserted in a disk queue according to the principles of the present invention.

With respect to the flow chart shown in FIG. 3, the insertion of a $W_{nn}$ write request into the disk queue 32 will be described. Once a write request for a page $p_w$, arrives in the write buffer pool (S40), the media segment file server 12 assigns a deadline to the write request (S42), as described above. Next, the write request is to be inserted into the disk queue 32. This is achieved in the following way.

The scheduling process of the media segment file server 12 determines where page $p_w$ goes under scan order 44 and attempts to insert the new write request into its scan order in the disk queue 32. Several possibilities may arise in this case.

1. no deadline of any read or write request in the disk queue 32, including the new write request being inserted, gets violated,
2. the deadline of the new write request will not be violated if it is inserted in scan order, but upon inserting it, the deadline of some other read request(s) will be violated,
3. the deadline of the new write request will not be violated if it is inserted in scan order, but upon inserting it, the deadline of some other write request(s) will be violated, or
4. the deadline of the new write request will be violated if it is inserted in scan order.

How the scheduling process will handle each of these possibilities is described below. Case 1 is easy to handle and represents the best possible scenario. If the scheduling process finds that it is possible to insert a write request in scan order into the queue 32 without violating any of the deadlines of the read and write requests that already exist in the queue 32, as well as the deadline of the new write request (S46), then the new write request will be inserted in the disk queue 32 in its scan order (S48).

In Case 2, the deadline of the new write request is not violated when it gets inserted in its scan order (S50), but upon inserting it, the deadline of some other read request(s) are violated (S52). The process attempts to avoid losing the read request(s) that have their deadlines violated. If the write request can be placed at the end of the queue 32 without getting its own deadline violated (S54), then the process places the new write request at the end of the disk queue 32 and not in scan order (S56). This will result in saving the read request(s) with violated deadlines from being lost. One possible optimization here is to maintain another scan order at the end of the queue 32, termed the next scan order, and then attempting to insert the new write request into this next scan order instead of simply placing it at the end of the queue 32.

Cases 1 and 2 constitute the typical scenario during the regular system operation. On the other hand, cases 3 and 4 are extreme cases that happen only if the rate of write requests exceeds the predetermined upper limit at system configuration time. When the frequency of occurrence of Cases 3 and 4 during system operation becomes significant, this indicates that the request pattern changed significantly and that it is time to reevaluate system parameters, e.g., expanding the size of the write buffer pool 28.

It remains to show how the scheduling process handles Cases 3 and 4. In Case 3, the new write request is determined to violate the deadline of another write request that already exists in the disk queue 32 (S58). In this case, the process moves all of the write requests that have their deadlines violated to the head of the disk queue 32 (S60). As a result of this action, read requests whose deadlines become violated are considered lost. If a write request deadline is not violated, the new write request is inserted in scan order (S59).

Case 3 (new write requests violating the deadlines of other write requests) represents an extreme situation which indicates that the write buffer pool 28 is getting congested and that the system is getting overloaded. This situation should be avoided by the admission control process of the video server 10. However, in case it happens, the process handles it as described above.

In Case 4, the deadline of the new write request will be violated if it is inserted in its scan order (S50). Recall that the deadline of a write request is computed based on the time by which the write request will get full. As a result, the write request cannot afford having its deadlines violated as this will result in a buffer overflow and possible loss of the write requests. Since $W_{nn}$ pages cannot be lost (by definition), the process has to schedule the new write request without violating its deadline. This is achieved as follows.

The process places the new write request at the head of the queue 32 (S62). The read requests whose deadlines become violated are considered lost, while the write requests whose deadlines become violated (S64) are treated as in Case 3, i.e., are moved to the head of the queue 32 (S60), along with the new right request. In both Cases 3 and 4, the write requests that are moved to the head of the queue 32 are ordered among themselves in scan order.

Notice that since absolute deadlines are stored for both read and write requests, upon insertion of a new request, the deadlines of each request that is past the new request in SCAN order need not be updated.

Processing a $W_{nn}$ Write Request

In all of the above cases, once a write page $p_w$ is inserted into the disk queue 32, it is guaranteed that it will be written physically into the disk 30, i.e., it does not get deleted from the disk queue 32.

Writing a page into disk 30 will result in free buffer space (the space that is occupied by the write page). Therefore, once a page is written into disk 30, we can relax the deadline of all the pages in the write buffer pool 28 as well as the deadline of the write pages in the disk queue 32.

We relax the deadline of the pages in the write buffer pool 28 by modifying the global variable d(t), as discussed previously.

Similarly, for the disk queue 32, upon writing a write page into the disk 30, we apply the following procedure. Let the current time be t.

1. scan the disk queue 32
2. locate all the write requests in the queue 32
3. for each write request $p_w$ in the disk queue 32, with priority $d_w(t_o)$ ($t_o$ is the last time $d_w(t_o)$ is modified), set $$d_w(t) \leftarrow t - t_o + d_w(t_o) + \frac{1}{\lambda_w}$$

The reason for this deadline relaxation is to reduce the requirements of the overall system, and hence reduce the number of read page losses.

Inserting and Processing an $R_{dl}$ Read Request

Figure 4:
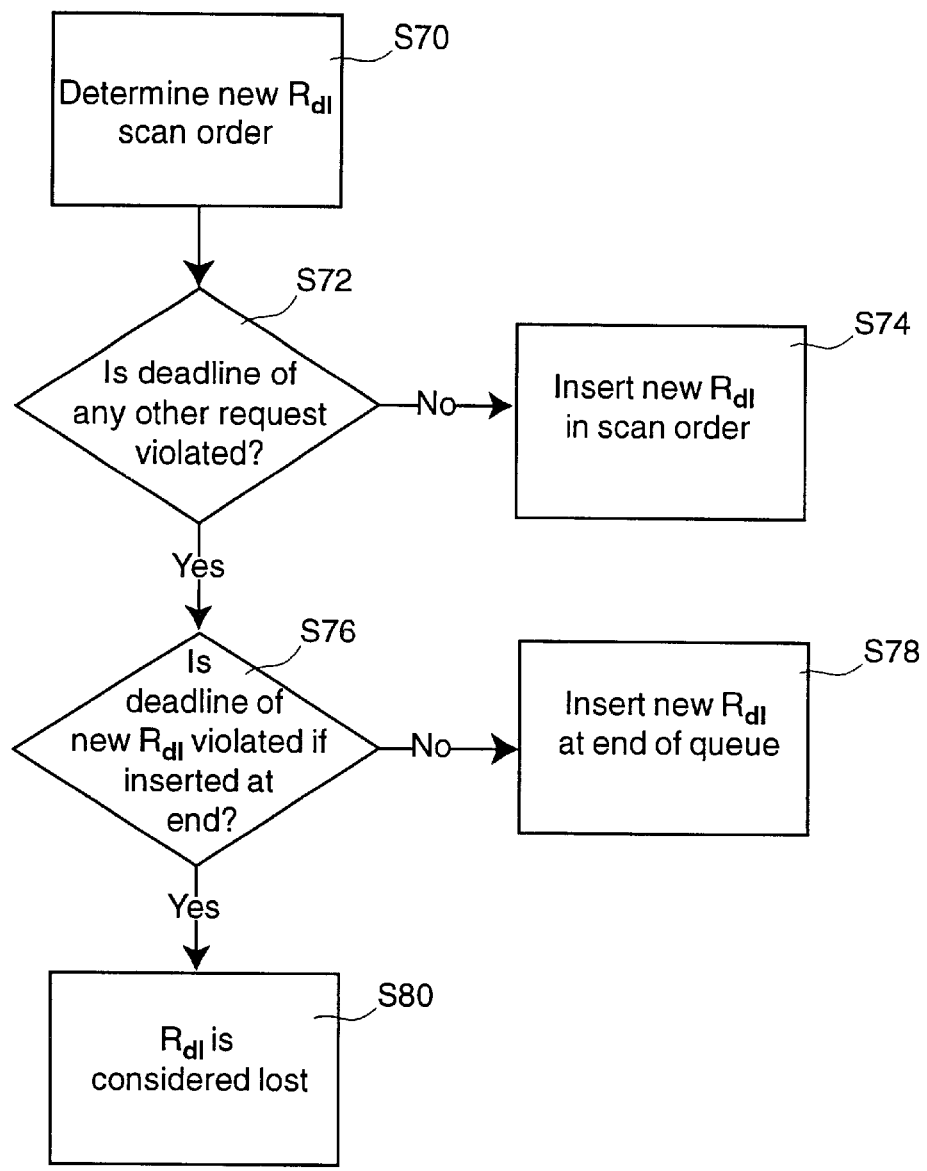
FIG. 4 is a flow chart illustrating the process used for determining the location that $R_{dl}$ type read requests are inserted in a disk queue according to the principles of the present invention.

The handling of an $R_{dl}$ read request is similar to what is being performed in the original SCANRT process. When a new $R_{dl}$ read request arrives to the disk queue 32, the process attempts to insert the request into the correct SCAN order, as shown in the flow chart of FIG. 4.

First, the process locates the position in the queue 32 that corresponds to the page's scan order (S70). Before inserting the request into that position, the process checks to see if the deadline of any of the requests in the queue 32 is violated (S72). This applies to both the read and write requests that already exist in the disk queue 32. If no deadline is violated, then the $R_{dl}$ new read request gets inserted into the disk queue 32 in its scan order (S74). If one (or more) deadline is violated, then the new $R_{dl}$ read request is not inserted into its scan position in the queue 32. Instead, an attempt is made to insert it at the end of the queue 32. In this case, if it is determined that the deadline of the new $R_{dl}$ read request is not violated (S76), then it is inserted at the end of the queue 32 (S78). Otherwise, the $R_{dl}$ read request is considered lost and is not processed by the system (S80).

One possible optimization here is to search for write requests in the queue 32 that can afford to be repositioned at the end of the disk queue 32 without getting their deadline violated. This repositioning of the write requests is performed only if it will result in accommodating the new read request into the read request's scan order with its deadline matched.

A second method for estimating the deadline of write requests will now be presented that results in an improvement in the performance of the disk scheduling process over the method described above.

For purposes of the following description, let the disk queue 32 be denoted by D, the request (read or write) at location i of the queue 32 denoted by D[i], and the request at the head of the queue 32 be denoted by D[0].

Assume that a write request $w_n$ is inserted into the disk queue 32 at location n, i.e., D[n]=$w_n$. Let the number of write requests at positions 0 through n−1 of the disk queue 32 be denoted by NumWrites(n−1). NumWrites(n−1) represents the number of write requests ahead of $w_n$ in the disk queue 32 and that will, most likely, be processed by the disk scheduling system prior to processing $W_n$ (unless some shuffling of the write requests take place due to deadline conflicts, as prescribed by the system).

The processing of one write request implies that a page will be written into the disk 30 and hence freeing some buffer space in the write buffer pool 28. As a result, if a write request, say $w_o$, is processed by the disk scheduling process, this will result in relaxing the deadline of all the pending write requests by $1/\lambda_w$. We make use of this fact to predict a better (more optimistic) deadline of write requests at the time of inserting them into the disk queue 32.

Assume that a write request $w_n$ is inserted into the disk queue 32 at time t into location n of the disk queue 32. Upon insertion of $w_n$, we compute the deadline of $w_n$ in the following way.

$$d_w(t) = t + \frac{n_f(t) + NumWrites(n-1)}{\lambda_w}$$

Contrast this to the formula for computing the deadline of $w_n$ that is given in the first embodiment of the present invention. The new formula takes into consideration the number of write requests ahead of $w_n$ in the disk queue 32, and hence provides a more realistic and relaxed deadline for write requests. This is expected to reduce the congestion of the system in terms of reducing the number of lost read requests. This is due to the less demand now imposed on write requests in terms of their relaxed deadline.

Several implications and modifications to the disk scheduling process arise because of this modification in computing the deadline of write requests. There is no longer a need to update the deadline of write requests once the system processes a write request (by physically writing a page into disk 30). Therefore, the update procedure, upon processing a write request, is not needed anymore. On the other hand, the deadlines of write requests in the disk queue 32 need to be re-adjusted whenever a write request is placed or relocated into a new location by the system e.g., when moving a write request to the head of the queue 32.

Inserting and Processing $R_{nn}$ Read Requests

The $R_{nn}$ category of read requests are useful for video editing applications. They have the following characteristics.

1. An $R_{nn}$ read request has no real-time deadline. Therefore, they can afford longer delays than other requests.
2. Although it does not have a deadline, an $R_{nn}$ read request still cannot wait indefinitely. It has to be fulfilled some time in the future.
3. An $R_{nn}$ read request cannot be lost due to system load, etc. Regardless of the system load, an $R_{nn}$ read request has to be fulfilled by the system at some point in time. Because the read pages are candidates for being edited, the user should get all of them, i.e., the process should guarantee to the user that none of them gets lost at reading time.

For $W_{nn}$ write requests, because of the lack of a deadline, they are considered as of a lower priority than $R_{dl}$ read requests. Similarly, because of the lack of a deadline, $R_{nn}$ read requests are considered as having a lower priority than $R_{dl}$ read requests. However, in contrast to write requests, since $R_{nn}$ read requests have no buffer problems (as long as there is room for the page to be read), we can also consider $R_{nn}$ requests as having less priority than write requests. Therefore, the system gives $R_{nn}$ read requests the least priority in terms of scheduling. As a result, an $R_{nn}$ read request is put into the disk queue 32 only when there are no pending $W_{nn}$ or $R_{dl}$ requests in the system.

During the execution of the process, the following assertion holds.

$$\forall t \forall p_w : d_w(t) = d(t)$$

This assertion can be rephrased in the following way. Given the deadline assignments and their maintenance performed by the system, as described in the previous sections, the deadlines for each write page is equal to the deadline for all the other write pages at all times during the execution of the process.

Assuming for now that this assertion is true, the process can be simplified significantly without affecting the system's performance. In other words, instead of updating the deadline for multiple copies that have the same values, we only maintain a deadline for one copy and use it for all the write page requests.

The assertion implies that in fact we need to maintain only one global deadline ($d(t)$) for all the write pages that reside in the disk queue. As a result, upon writing a page into the disk, only $d(t)$ needs to be updated, and there is no need to scan the write pages that are in the disk queue in order to update their deadlines.

During the execution of the process, the following assertion also holds.

$$\forall t \geq t_o : d(t) = t_o + \frac{N_w + N_{serviced}(t)}{\lambda_w}$$

where $t_o$ is the time at the beginning of the execution of the process, $N_w$ is the total number of pages that the write buffer pool 28 can accommodate, and $N_{serviced}(t)$ is the total number of write pages that are serviced (written) by the disk 30 from time $t_o$ until time $t$. Assuming that the process starts at time $t_o = 0$, then $$\forall t \geq 0 : d(t) = \frac{N_w + N_{serviced}(t)}{\lambda_w}.$$

One important advantage of the new read/write scheduling process is that it treats both read and write requests in a homogeneous way in terms of deadlines and placing them, as much as possible, in scan order.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of supporting simultaneous disk read and write requests in a video server, comprising the steps of:

assigning a deadline to said write requests, where each deadline is computed from an amount of available space in a buffer pool, an arrival rate of the write requests, and a time at which the corresponding write request was made;

inserting said read requests and said write requests in a common disk queue; and processing said read and write requests which come to a head of said queue.

2. The method according to claim 1, wherein said step of inserting said read requests and said write requests in a common disk queue further comprise the steps of determining where a write request goes under scan order, determining if any of said assigned deadlines would be violated by inserting said write request in scan order, if not, inserting said write request in said disk queue in scan order.

3. The method according to claim 2, wherein said step of inserting said read requests and said write requests in a common disk queue further comprise the steps of determining if a deadline of a new write request is violated by inserting said new write request in scan order, if so placing said new write request at the head of said queue.

4. The method according to claim 3, further comprising the step of determining if a deadline of any other write requests are violated and if so moving said write requests having violated deadlines to the head of said queue in scan order.

5. The method according to claim 3, further comprising the step of determining if a deadline of any read requests are violated by inserting said new write request in scan order, and if so, determining if said deadline of said new write request would be violated by inserting said new write request at an end of said queue and if not, inserting said new write request at an end of said queue.

6. The method according to claim 5, wherein if it is determined that said new write request can not be inserted at an end of said queue without violating said new write request's deadline, it is determined if a deadline for any other write request would be violated by inserting said new write request in scan order, if not said new write request is inserted in scan order.

7. The method according to claim 6, wherein if it is determined that a deadline for another write request would be violated by inserting said new write request in scan order, all write requests with a violated deadline are moved to the head of said queue in scan order.

8. The method according to claim 1, wherein said step of inserting said read requests and said write requests in a common disk queue further comprise the steps of determining if a deadline of a read or write request in said queue is violated by inserting a new read request in scan order, if not, inserting said new read request in scan order.

9. The method according to claim 1, wherein said step of inserting said read requests and said write requests in a common disk queue further comprise the steps of determining if a deadline of a read or write request in said queue is violated by inserting a new read request in scan order, if so, determining if a deadline of said new read request would be violated if said new read request is inserted at an end of said queue, and if not, inserting said read request at the end of said queue.

10. The method of claim 1 wherein the deadline for a write request is computed as follows:

deadline=time of the request+(an amount of available space in a buffer pool/an arrival rate of the write requests).

11. A video server architecture for supporting simultaneous disk read and write requests, comprising:
a memory buffer pool in which said read and write requests are temporarily stored;
a common disk queue in which said read and write requests are received from said memory buffer pool; and
a file server for processing said read and write requests, said file server having at least one disk;
control means for determining locations for inserting said read and write requests in said disk queue, wherein each write request is assigned a deadline, such that the deadline is computed from a time at which the request was made, an amount of available space in a buffer pool, and an arrival rate of the write requests.

12. The video server according to claim 11, wherein said read and write requests are inserted in said queue according to a process which includes a determination of where a new write request goes under scan order.

13. The video server according to claim 12, wherein said process further determines whether any of said assigned deadlines are violated by inserting said new write request in scan order, and if not, inserting said new write request in scan order.

14. The video server according to claim 13, wherein said process further determines whether a deadline of a new write request is violated if said new write request is inserted in scan order, and if so, said new write request is inserted at a head of said disk queue.

15. The video server according to claim 14, wherein said process further determines whether a deadline for any other write requests are violated by inserting said new write request at the head of said disk queue, and if so, the write requests with violated deadlines are moved to the head to the queue in scan order.

16. The video server according to claim 15, wherein said process further determines whether a deadline of a new write request is violated if said new write request is inserted in scan order, and if not, it is determined whether a deadline of a read request would be violated if said new write request is inserted in scan order, if so, it is determined whether said new write request can be inserted at an end of said disk queue without violating said deadline of said new write request, if so, said write request is inserted at and end of said disk queue.

17. The video server according to claim 12, wherein said process includes a determination of whether a deadline of any write requests would be violated if said new write request were inserted in scan order, and if so, moving all write requests with violated deadlines to a head of said disk queue.

18. The video server architecture of claim 11 wherein the deadline for a write request is computed as follows:

deadline=time of the request+(an amount of available space in a buffer pool/an arrival rate of the write requests).

19. A method of supporting simultaneous disk read and write requests in a video server, comprising the steps of:
determining a deadline for said write requests, such that each deadline is based on an amount of available space in a buffer pool, an arrival rate of the write requests, and a time at which the corresponding write request was made;
inserting said read requests and said write requests in a common disk queue, where the insertion of the write requests are based on the deadline associated with the write requests; and
processing said read and write requests which come to a head of said queue.

20. The method of claim 19 wherein the deadline for a write request is computed as follows:

deadline=time of the request+(an amount of available space in a buffer pool/an arrival rate of the write requests).

* * * * *